United States Patent
Fricke et al.

(10) Patent No.: US 10,717,841 B2
(45) Date of Patent: *Jul. 21, 2020

(54) PROCESS FOR PRODUCING POROUS MATERIALS

(71) Applicant: BASF SE, Ludwigshafen (DE)

(72) Inventors: Marc Fricke, Osnabrueck (DE); Dirk Weinrich, Osnabrueck (DE); Wibke Loelsberg, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 182 days.

This patent is subject to a terminal disclaimer.

(21) Appl. No.: 15/128,515

(22) PCT Filed: Mar. 24, 2015

(86) PCT No.: PCT/EP2015/056207
§ 371 (c)(1),
(2) Date: Sep. 23, 2016

(87) PCT Pub. No.: WO2015/144675
PCT Pub. Date: Oct. 1, 2015

(65) Prior Publication Data
US 2018/0171092 A1    Jun. 21, 2018

(30) Foreign Application Priority Data
Mar. 24, 2014  (EP) .................... 14161246

(51) Int. Cl.
| | | |
|---|---|---|
| *C08J 9/28* | (2006.01) | |
| *C08G 18/32* | (2006.01) | |
| *C08G 18/28* | (2006.01) | |
| *C08G 18/09* | (2006.01) | |
| *C08G 18/08* | (2006.01) | |
| *C08G 18/18* | (2006.01) | |
| *C08G 18/20* | (2006.01) | |
| *C08G 18/22* | (2006.01) | |
| *C08G 18/30* | (2006.01) | |
| *C08G 18/76* | (2006.01) | |
| *F16L 59/065* | (2006.01) | |
| *C08G 101/00* | (2006.01) | |
| *B65D 81/38* | (2006.01) | |

(52) U.S. Cl.
CPC ............ *C08J 9/286* (2013.01); *C08G 18/092* (2013.01); *C08G 18/14* (2013.01); *C08G 18/1875* (2013.01); *C08G 18/2036* (2013.01); *C08G 18/2063* (2013.01); *C08G 18/225* (2013.01); *C08G 18/282* (2013.01); *C08G 18/2825* (2013.01); *C08G 18/30* (2013.01); *C08G 18/302* (2013.01); *C08G 18/3243* (2013.01); *C08G 18/7671* (2013.01); *C08J 9/28* (2013.01); *B65D 81/38* (2013.01); *C08G 2101/00* (2013.01); *C08G 2330/00* (2013.01); *C08J 2201/04* (2013.01); *C08J 2201/0502* (2013.01); *C08J 2205/024* (2013.01); *C08J 2375/04* (2013.01); *F16L 59/065* (2013.01)

(58) Field of Classification Search
CPC .. C08G 18/092; C08G 18/14; C08G 18/1875; C08G 18/2036; C08G 18/225; C08G 18/2825; C08G 18/302; C08G 18/3243; C08G 18/7671; C08G 2101/00; C08J 9/286; C08J 2201/0502; C08J 2205/024
See application file for complete search history.

(56) References Cited

U.S. PATENT DOCUMENTS

| | | | |
|---|---|---|---|
| 5,478,867 A | 12/1995 | Tabor | |
| 5,990,184 A * | 11/1999 | Biesmans | ............ C08G 18/092 521/125 |
| 2007/0259979 A1 | 11/2007 | Lee | |
| 2010/0148109 A1 | 6/2010 | Schädler | |
| 2012/0115969 A1* | 5/2012 | Fricke | ........................ C08J 9/28 521/163 |
| 2012/0305827 A1 | 12/2012 | Fricke et al. | |

FOREIGN PATENT DOCUMENTS

| | | |
|---|---|---|
| AU | 5862099 A | 5/2000 |
| AU | 2011/273624 A1 | 1/2013 |
| AU | 2011/325338 A1 | 5/2013 |
| WO | 95/02009 A1 | 1/1995 |
| WO | 00/24799 A1 | 5/2000 |

(Continued)

OTHER PUBLICATIONS

International Search Report and Written Opinion dated Apr. 23, 2015, in PCT/EP2015/056207 filed Mar. 24, 2015.
"Polyurethane", 3rd edition, G. Oertel, Hanser Verlag, 1993, 16 Pages (Submitting Table of Contents Only).
Hans Zweifel, "Plastics Additives Handbook", 5th Edition, Hanser Publishers, 2001, 29 Pages (Submitting Table of Contents Only).

*Primary Examiner* — John M Cooney

(74) *Attorney, Agent, or Firm* — Oblon, McClelland, Maier & Neustadt, L.L.P.

(57) ABSTRACT

The present invention relates to a process for preparing a porous material, at least comprising the steps of providing a mixture (I) comprising a composition (A) comprising at least one monool (am) and a composition (A*) comprising components suitable to form an organic gel and a solvent (B), reacting the components in the composition (A) in the presence of the solvent (B) to form a gel, and drying of the gel obtained in step b). The invention further relates to the porous materials which can be obtained in this way and the use of the porous materials as thermal insulation material and in vacuum insulation panels, in particular in interior or exterior thermal insulation systems.

13 Claims, No Drawings

(56) References Cited

FOREIGN PATENT DOCUMENTS

| WO | 2008/138978 A1 | 11/2008 |
| WO | 2009/027310 A1 | 3/2009 |
| WO | 2011/069959 A2 | 6/2011 |
| WO | 2012/000917 A1 | 1/2012 |
| WO | 2012/059388 A1 | 5/2012 |

* cited by examiner

PROCESS FOR PRODUCING POROUS MATERIALS

The present invention relates to a process for preparing a porous material, at least comprising the steps of providing a mixture (I) comprising a composition (A) comprising at least one monool (am) and a composition (A*) comprising components suitable to form an organic gel and a solvent (B), reacting the components in the composition (A) in the presence of the solvent (B) to form a gel, and drying of the gel obtained in step b). The invention further relates to the porous materials which can be obtained in this way and the use of the porous materials as thermal insulation material and in vacuum insulation panels.

Porous materials, for example polymer foams, having pores in the size range of a few microns or significantly below and a high porosity of at least 70% are particularly good thermal insulators on the basis of theoretical considerations.

Such porous materials having a small average pore diameter can be, for example, in the form of organic aerogels or xerogels which are produced with a sol-gel process and subsequent drying. In the sol-gel process, a sol based on a reactive organic gel precursor is first produced and the sol is then gelled by means of a crosslinking reaction to form a gel. To obtain a porous material, for example an aerogel, from the gel, the liquid has to be removed. This step will hereinafter be referred to as drying in the interests of simplicity.

WO 95/02009 discloses isocyanate-based xerogels which are particularly suitable for applications in the field of vacuum insulation. The publication also discloses a sol-gel-based process for producing the xerogels, in which known, inter alia aromatic, polyisocyanates and an unreactive solvent are used. As further compounds having active hydrogen atoms, use is made of aliphatic or aromatic polyamines or polyols. The examples disclosed in the publication comprise ones in which a polyisocyanate is reacted with diaminodiethyltoluene. The xerogels disclosed generally have average pore sizes in the region of 50 μm. In one example, mention is made of an average pore diameter of 10 μm.

WO 2008/138978 discloses xerogels which comprise from 30 to 90% by weight of at least one polyfunctional isocyanate and from 10 to 70% by weight of at least one polyfunctional aromatic amine and have a volume average pore diameter of not more than 5 microns.

WO 2011/069959, WO 2012/000917 and WO 2012/059388 describe porous materials based on polyfunctional isocyanates and polyfunctional aromatic amines, where the amine component comprises polyfunctional substituted aromatic amines. The porous materials described are produced by reacting isocyanates with the desired amount of amine in a solvent which is inert toward the isocyanates. The use of catalysts is known from WO 2012/000917 and WO 2012/059388.

However, the materials properties, in particular the mechanical stability and/or the compressive strength and also the thermal conductivity, of the known porous materials based on polyurea are not satisfactory for all applications. In particular, the thermal conductivities in the ventilated state are not sufficiently low. In the case of open-cell materials, the ventilated state is the state under ambient pressure of air, whereas in the case of partially or completely closed-cell materials such as rigid polyurethane foams this state is reached only after aging, after the cell gas has gradually been completely replaced.

A particular problem associated with the formulations based on isocyanates and amines which are known from the prior art are mixing defects. Mixing defects occur as a result of the high reaction rate between isocyanates and amino groups, since the gelling reaction has already proceeded a long way before complete mixing. Mixing defects lead to porous materials having heterogeneous and unsatisfactory materials properties.

Another disadvantage of known porous materials is often the high water uptake which results in an increased thermal conductivity, i.e. reduces the insulating properties of the material.

It was therefore an object of the invention to avoid the abovementioned disadvantages. In particular, a porous material which does not have the abovementioned disadvantages, or has them to a reduced extent, should be provided. The porous materials should have a low thermal conductivity in the ventilated state, i.e. at atmospheric pressure. Furthermore, the porous material should at the same time have a high porosity, a low density and a sufficiently high mechanical stability.

According to the present invention, this object is solved by a process for preparing a porous material, at least comprising the steps of:
  a) providing a mixture (I) comprising
     (i) a composition (A) comprising at least one monool (am) and a composition (A*) comprising components suitable to form an organic gel and
     (ii) a solvent (B),
  b) reacting the components in the composition (A) in the presence of the solvent (B) to form a gel, and
  c) drying of the gel obtained in step b).

The porous materials of the present invention are preferably aerogels or xerogels.

Preferred embodiments may be found in the claims and the description. Combinations of preferred embodiments do not go outside the scope of the present invention. Preferred embodiments of the components used are described below.

According to the present invention, in the process for preparing a porous material a mixture (I) comprising a composition (A) comprising at least one monool (am) and a composition (A*) comprising components suitable to form an organic gel and a solvent (B) is provided in step a).

Composition (A) comprises at least one monool (am). According to step b) the components in composition (A) are reacted in the presence of the solvent (B) to form a gel. The gel is then dried according to step c) of the process of the present invention.

The process as disclosed above results in porous materials with improved properties, in particular improved thermal conductivity.

The composition (A*) may be any composition comprising components suitable to form an organic gel. Preferably, the composition (A*) comprises at least one polyfunctional isocyanate as component (a1) and possibly further components.

According to a further embodiment, the present invention thus is directed to the process for preparing a porous material as disclosed above, wherein the composition (A*) comprises at least one polyfunctional isocyanate as component (a1).

Composition (A*) may also comprise further components, such as components which react with the polyfunctional isocyanate, one or more catalysts and optionally water. Preferably, the composition (A*) comprises at least one polyfunctional isocyanate as component (a1), and at least one aromatic amine as component (a2), optionally comprises water as component (a3), and optionally comprises at least one catalyst as component (a4).

According to a further embodiment, the present invention therefore is directed to the process for preparing a porous material as disclosed above, wherein the composition (A) comprises at least one monool (am), at least one polyfunctional isocyanate as component (a1), and at least one aromatic amine as component (a2), optionally comprises water as component (a3), and optionally comprises at least one catalyst as component (a4).

The polyfunctional isocyanates (a1) will hereinafter be referred to collectively as component (a1). Analogously, the aromatic amines (a2) will hereinafter be referred to collectively as component (a2). It will be obvious to a person skilled in the art that the monomer components mentioned are present in reacted form in the porous material.

For the purposes of the present invention, the functionality of a compound is the number of reactive groups per molecule. In the case of the monomer component (a1), the functionality is the number of isocyanate groups per molecule. In the case of the amino groups of the monomer component (a2), the functionality is the number of reactive amino groups per molecule. A polyfunctional compound has a functionality of at least 2.

If mixtures of compounds having different functionalities are used as component (a1) or (a2), the functionality of the components is in each case given by the number average of the functionality of the individual compounds. A polyfunctional compound comprises at least two of the abovementioned functional groups per molecule.

For the purposes of the present invention, a xerogel is a porous material which has been produced by a sol-gel process in which the liquid phase has been removed from the gel by drying below the critical temperature and below the critical pressure of the liquid phase ("subcritical conditions"). An aerogel is a porous material which has been produced by a sol-gel process in which the liquid phase has been removed from the gel under supercritical conditions.

Composition (A) comprises at least one monool (am). In principle, any monool can be used in the context of the present invention. It is also possible according to the present invention that the composition (A) comprises two or more monools. The monool can be branched or linear. Primary, secondary or tertiary alcohols are suitable according to the present invention. Preferably, the monool (am) is a linear alcohol, more preferred a linear primary alcohol. The monool can be an aliphatic monool or an aromatic monool in the context of the present invention. Furthermore, the monool can also contain further functional groups as long as these do not react with the other components under the conditions of the process according to the present invention. The monool may for example contain C—C— double bonds or C—C triple bonds. The monool can for example be a halogenated monool, in particular a fluorinated monool such as a polyfluorinated monool or a perfluorinated monool.

In the context of the present invention, the monool may also be chosen from allyl alcohols, alkylphenols, or propargyl alcohol. Furthermore, alkoxylates can be used in the context of the present invention such as fatty alcohol alkoxylates, oxo alcohol alkoxylates, or alkyl phenol alkoxylates.

According to a further preferred embodiment, the monool is selected from aliphatic or aromatic monools with 1 to 20 carbon atoms. Therefore, according to a further embodiment, the present invention is directed to the process for preparing a porous material as disclosed above, wherein the monool is selected from the group consisting of aliphatic monools with 1 to 20 carbon atoms and aromatic monools with 1 to 20 carbon atoms.

Suitable primary alcohols are for example linear alcohols such as methanol, ethanol, propanol, n-butanol, n-pentanol, n-hexanol, n-heptanol, n-octanol, n-nonanol, n-decanol, n-dodecanol, n-tetradecanol, n-hexadecanol, n-octadecanol and n-eicosanol. Suitable branched primary alcohols are for example isobutanol, isopentanol, isohexanol, isooctanol, isostearyl alcohol and iso-palmityl alcohol, 2-ethylhexyl alcohol, 3-n-propyl heptyl alcohol, 2-n-propyl heptyl alcohol, and 3-isopropyl heptyl alcohol.

Suitable secondary alcohols are for example isopropanol, sec-butanol, sec-pentanol (pentane-2-ol), pentane-3-ol, cyclopentanol, cyclohexanol, sec-hexanol (hexane-2-ol), hexane-3-ol, sec-heptanol (heptane-2-ol), heptane-3-ol, sec-decanol and decan-3-ol.

Examples of suitable tertiary alcohols are tert-butanol and tert-amyl alcohol.

Generally, the amount of monool present in the composition (A) can vary in wide ranges. Preferably, the monool is present in the composition (A) in an amount of from 0.1 to 30% by weight based on the composition (A), more preferable in an amount of from 0.5 to 25% by weight based on the composition (A), in particular in an amount of from 1.0 to 22% by weight based on the composition (A), for example in an amount of from 1.5 to 20% by weight based on the composition (A).

According to a further embodiment, the present invention thus is directed to the process for preparing a porous material as disclosed above, wherein the monool is present in the composition (A) in an amount of from 0.1 to 30% by weight based on the composition (A).

Composition (A*) and thus also composition (A) comprises components suitable to form an organic gel in suitable amounts. The reaction is for example carried out using from 25 to 94.9% by weight of component (a1), from 0.1 to 30% by weight of component (a2), from 0 to 15% by weight of water and from 0 to 30% by weight of component (a4), in each case based on the total weight of the components (a1) to (a4), where the % by weight of the components (a1) to (a4) add up to 100% by weight.

The reaction is preferably carried out using from 35 to 93.8% by weight, in particular from 40 to 92.6% by weight, of component (a1), from 0.2 to 25% by weight, in particular from 0.4 to 23% by weight, of component (a2), from 0.01 to 10% by weight, in particular from 0.1 to 9% by weight, of water and from 0.1 to 30% by weight, in particular from 1 to 28% by weight, of component (a4), in each case based on the total weight of the components (a1) to (a4), where the % by weight of the components (a1) to (a4) add up to 100% by weight.

The reaction is particularly preferably carried out using from 50 to 92.5% by weight, in particular from 57 to 91.3% by weight, of component (a1), from 0.5 to 18% by weight, in particular from 0.7 to 16% by weight, of component (a2), from 0.01 to 8% by weight, in particular from 0.1 to 6% by weight, of water and from 2 to 24% by weight, in particular from 3 to 21% by weight, of component (a4), in each case based on the total weight of the components (a1) to (a4), where the % by weight of the components (a1) to (a4) add up to 100% by weight.

Within the abovementioned preferred ranges, the resulting gels are particularly stable and do not shrink or shrink only slightly in the subsequent drying step.

Component (a1)

In the process of the invention, preferably at least one polyfunctional isocyanate is reacted as component (a1).

Preferably the amount of component (a1) used is at least 35, in particular at least 40, particularly preferably at least 45% by weight, especially at least 57% by weight. Preferably the amount of component (a1) used is at most 93.8% by weight, in particular at most 92.6% by weight, particularly preferably at most 92.5% by weight, especially at most 91.3% by weight, in each case based on the total weight of the composition (A*).

Possible polyfunctional isocyanates are aromatic, aliphatic, cycloaliphatic and/or araliphatic isocyanates. Such polyfunctional isocyanates are known per se or can be prepared by methods known per se. The polyfunctional isocyanates can also be used, in particular, as mixtures, so that the component (a1) in this case comprises various polyfunctional isocyanates. Polyfunctional isocyanates which are possible as monomer building blocks (a1) have two (hereinafter referred to as diisocyanates) or more than two isocyanate groups per molecule of the monomer component.

Particularly suitable polyfunctional isocyanates are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethylbiphenyl diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

As polyfunctional isocyanates (a1), preference is given to aromatic isocyanates. Particularly preferred polyfunctional isocyanates of the component (a1) are the following embodiments:

i) polyfunctional isocyanates based on tolylene diisocyanate (TDI), in particular 2,4-TDI or 2,6-TDI or mixtures of 2,4- and 2,6-TDI;
ii) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates or crude MDI which is obtained in the production of MDI or mixtures of at least one oligomer of MDI and at least one of the abovementioned low molecular weight MDI derivatives;
iii) mixtures of at least one aromatic isocyanate according to embodiment i) and at least one aromatic isocyanate according to embodiment ii).

Oligomeric diphenylmethane diisocyanate is particularly preferred as polyfunctional isocyanate. Oligomeric diphenylmethane diisocyanate (hereinafter referred to as oligomeric MDI) is an oligomeric condensation product or a mixture of a plurality of oligomeric condensation products and thus a derivative/derivatives of diphenylmethane diisocyanate (MDI). The polyfunctional isocyanates can preferably also be made up of mixtures of monomeric aromatic diisocyanates and oligomeric MDI.

Oligomeric MDI comprises one or more condensation products of MDI which have a plurality of rings and a functionality of more than 2, in particular 3 or 4 or 5. Oligomeric MDI is known and is frequently referred to as polyphenylpolymethylene isocyanate or as polymeric MDI. Oligomeric MDI is usually made up of a mixture of MDI-based isocyanates having various functionalities. Oligomeric MDI is usually used in admixture with monomeric MDI.

The (average) functionality of an isocyanate comprising oligomeric MDI can vary in the range from about 2.2 to about 5, in particular from 2.4 to 3.5, in particular from 2.5 to 3. Such a mixture of MDI-based polyfunctional isocyanates having various functionalities is, in particular, crude MDI which is obtained in the production of MDI.

Polyfunctional isocyanates or mixtures of a plurality of polyfunctional isocyanates based on MDI are known and are marketed, for example, by BASF Polyurethanes GmbH under the name Lupranat®.

The functionality of the component (a1) is preferably at least two, in particular at least 2.2 and particularly preferably at least 2.5. The functionality of the component (a1) is preferably from 2.2 to 4 and particularly preferably from 2.5 to 3.

The content of isocyanate groups in the component (a1) is preferably from 5 to 10 mmol/g, in particular from 6 to 9 mmol/g, particularly preferably from 7 to 8.5 mmol/g. A person skilled in the art will know that the content of isocyanate groups in mmol/g and the equivalent weight in g/equivalent have a reciprocal relationship. The content of isocyanate groups in mmol/g can be derived from the content in % by weight in accordance with ASTM D-5155-96 A.

In a preferred embodiment, the component (a1) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate. In this preferred embodiment, the component (a1) particularly preferably comprises oligomeric diphenylmethane diisocyanate and has a functionality of at least 2.5.

The viscosity of the component (a1) used can vary within a wide range. The component (a1) preferably has a viscosity of from 100 to 3000 mPa·s, particularly preferably from 200 to 2500 mPa·s.

Component (a2)

Composition (A*) can further comprise at least one aromatic amine as component (a2). According to a further embodiment of the present invention, at least one aromatic amine is reacted as component (a2). The aromatic amine is a monofunctional amine or a polyfunctional amine.

Suitable monofunctional amines are for example substituted and unsubstituted aminobenzene, preferably substituted aniline derivatives having one or two alkyl residues, such as 2,6,-dimethylaniline, 2,6-diethylaniline, 2,6-diisopropylaninline, or 2-ethyl-6-isopropylaniline.

Preferably, the aromatic amine (a2) is a polyfunctional aromatic amine. According to a further embodiment, the present invention is directed to the process for preparing a porous material as disclosed above, wherein the at least one aromatic amine is a polyfunctional aromatic amine.

According to a further embodiment of the present invention, preferably at least one polyfunctional substituted aromatic amine (a2) having the general formula (I)

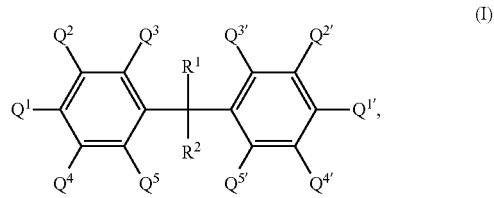

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula (I) comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group, is/are reacted as component (a2) in the presence of a solvent (B).

In a preferred embodiment, $Q^2$, $Q^4$, $Q^{2'}$ and $Q^{4'}$ are selected so that the compound having the general formula (I) has at least one linear or branched alkyl group, which can bear further functional groups, having from 1 to 12 carbon atoms in the α position relative to at least one primary amino group bound to the aromatic ring. Component (a2) in this case comprises polyfunctional aromatic amines (a2-s).

For the purposes of the present invention, polyfunctional amines are amines which have at least two amino groups which are reactive toward isocyanates per molecule. Here, primary and secondary amino groups are reactive toward isocyanates, with the reactivity of primary amino groups generally being significantly higher than that of secondary amino groups.

The amount of component (a2) used is preferably at least 0.2, in particular at least 0.4, particularly preferably at least 0.7% by weight, especially at least 1% by weight. The amount of component (a2) used is preferably at most 25% by weight, in particular at most 23% by weight, particularly preferably at most 18% by weight, especially at most 16% by weight, in each case based on the total weight of composition (A*).

According to a further embodiment, the present invention thus is directed to the process for preparing a porous material as disclosed above, wherein the at least one aromatic amine (a2) has the general formula (I)

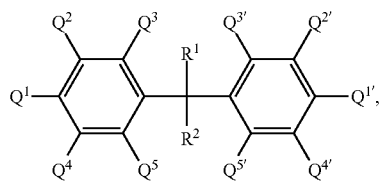

(I)

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula (I) comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group.

According to another further embodiment, the present invention is directed to the process for preparing a porous material as disclosed above, wherein composition (A*) comprises (a1) from 25 to 94.9% by weight of at least one polyfunctional isocyanate, and (a2) from 0.1 to 30% by weight of at least one polyfunctional aromatic amine having the general formula (I)

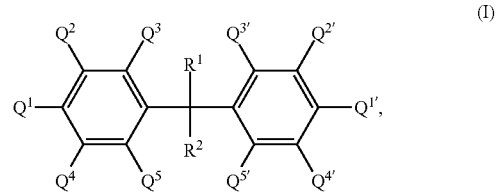

(I)

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula (I) comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group, (a3) from 0 to 15% by weight of water, and (a4) from 0.1 to 30% by weight of at least one catalyst, in each case based on the total weight of the components (a1), (a2), (a3), and (a4), where the % by weight of the components (a1), (a2), (a3), and (a4) add up to 100% by weight.

According to the invention, $R^1$ and $R^2$ in the general formula (I) are identical or different and are each selected independently from among hydrogen, a primary amino group and a linear or branched alkyl group having from 1 to 6 carbon atoms. $R^1$ and $R^2$ are preferably selected from among hydrogen and methyl. Particular preference is given to $R^1=R^2=H$.

$Q^2$, $Q^4$, $Q^{2'}$ and $Q^{4'}$ are preferably selected so that the substituted aromatic amine (a2-s) comprises at least two primary amino groups which each have one or two linear or branched alkyl groups having from 1 to 12 carbon atoms, which may bear further functional groups, in the a position. If one or more of $Q^2$, $Q^4$, $Q^{2'}$ and $Q^{4'}$ are selected so that they correspond to linear or branched alkyl groups which have from 1 to 12 carbon atoms and bear further functional groups, preference is given to amino groups and/or hydroxy groups and/or halogen atoms as such functional groups.

The reduced reactivity brought about by the abovementioned alkyl groups in the a position leads, in combination with the use of the component (a4) described in more detail below, to particularly stable gels having particularly good thermal conductivities in the ventilated state.

The alkyl groups as substituents Q in the general formula (I) are preferably selected from among methyl, ethyl, n-propyl, isopropyl, n-butyl, sec-butyl and tert-butyl.

The amines (a2-s) are preferably selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are each selected independently from among linear or branched alkyl groups which have from 1 to 12 carbon atoms and can bear further functional groups. The abovementioned alkyl groups are preferably methyl, ethyl, n-propyl, i-propyl, n-butyl, sec-butyl or t-butyl (in each case unsubstituted).

According to a further embodiment, the present invention therefore is directed to the process for preparing a porous material as disclosed above, wherein the amine component (a2) comprises at least one compound selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are selected independently from among linear or branched alkyl groups which have from 1 to 12 carbon atoms and can bear further functional groups.

In one embodiment, one, more than one or all hydrogen atoms of one or more alkyl groups of the substituents Q can have been replaced by halogen atoms, in particular chlorine. As an alternative, one, more than one or all hydrogen atoms of one or more alkyl groups of the substituents Q can have been replaced by $NH_2$ or OH. However, the alkyl groups in the general formula (I) are preferably made up of carbon and hydrogen.

In a particularly preferred embodiment, component (a2) comprises 3,3',5,5'-tetraalkyl-4,4'-diaminodiphenylmethane, where the alkyl groups can be identical or different and are each selected independently from among linear or branched alkyl groups which have from 1 to 12 carbon atoms and can optionally bear functional groups. The abovementioned alkyl groups are preferably selected from among unsubstituted alkyl groups, in particular methyl, ethyl, n-propyl, isopropyl, n-butyl, sec-butyl and tert-butyl, particularly preferably methyl and ethyl. Very particular preference is given to 3,3',5,5'-tetraethyl-4,4'-diaminodiphenylmethane and/or 3,3',5,5'-tetramethyl-4,4'-diaminodiphenylmethane.

The abovementioned polyfunctional amines of the type (a2-s) are known per se to those skilled in the art or can be prepared by known methods. One of the known methods is the reaction of aniline or derivatives of aniline with formaldehyde in the presence of an acid catalyst, in particular the reaction of 2,4- or 2,6-dialkylaniline.

The component (a2) can optionally also comprise polyfunctional aromatic amines (a2-u) which differ from the amines of the structure (a2-s). The aromatic amines (a2-u) preferably have exclusively aromatically bound amino groups, but can also have both (cyclo)aliphatically and aromatically bound reactive amino groups.

Suitable polyfunctional aromatic amines (a2-u) are, in particular, isomers and derivatives of diaminodiphenylmethane. Isomers and derivatives of diaminodiphenylmethane which are preferred as constituents of component (a2) are, in particular, 4,4'-diaminodiphenylmethane, 2,4'-diaminodiphenylmethane, 2,2'-diaminodiphenylmethane and oligomeric diaminodiphenylmethane.

Further suitable polyfunctional aromatic amines (a2-u) are, in particular, isomers and derivatives of toluenediamine. Isomers and derivatives of toluenediamine which are preferred as constituents of component (a2) are, in particular, toluene-2,4-diamine and/or toluene-2,6-diamine and diethyltoluenediamines, in particular 3,5-diethyltoluene-2,4-diamine and/or 3,5-diethyltoluene-2,6-diamine.

In a first, particularly preferred embodiment, component (a2) consists exclusively of polyfunctional aromatic amines of the type (a2-s). In a second preferred embodiment, component (a2) comprises polyfunctional aromatic amines of the types (a2-s) and (a2-u). In the latter, second preferred embodiment, the component (a2) preferably comprises at least one polyfunctional aromatic amine (a2-u), of which at least one is selected from among isomers and derivatives of diaminodiphenylmethane (MDA).

In the second preferred embodiment, component (a2) correspondingly particularly preferably comprises at least one polyfunctional aromatic amine (a2-u) selected from among 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more methylene-bridged condensation products of aniline and formaldehyde having a plurality of rings. Oligomeric MDA comprises at least one oligomer, but in general a plurality of oligomers, of MDA having a functionality of more than 2, in particular 3 or 4 or 5. Oligomeric MDA is known or can be prepared by methods known per se. Oligomeric MDA is usually used in the form of mixtures with monomeric MDA.

The (average) functionality of a polyfunctional amine (a2-u) comprising oligomeric MDA can vary in the range from about 2.3 to about 5, in particular from 2.3 to 3.5 and in particular from 2.3 to 3. One such mixture of MDA-based polyfunctional amines having differing functionalities is, in particular, crude MDA which is formed, in particular, as intermediate in the condensation of aniline with formaldehyde, usually catalyzed by hydrochloric acid, in the production of crude MDI.

In the abovementioned preferred second embodiment, particular preference is given to the component (a2) comprising oligomeric diaminodiphenylmethane as compound (a2-u) and having an overall functionality of at least 2.1.

The proportion of amines of type (a2-s) having the general formula (I) based on the total weight of all polyfunctional amines of the component (a2), which thus add up to a total of 100% by weight, is preferably from 10 to 100% by weight, in particular from 30 to 100% by weight, very particularly preferably from 50 to 100% by weight, in particular from 80 to 100% by weight.

The proportion of polyfunctional aromatic amines (a2-u) which differ from the amines of type (a2-s) based on the total weight of all polyfunctional amines of the component (a2) is preferably from 0 to 90% by weight, in particular from 0 to 70% by weight, particularly preferably from 0 to 50% by weight, in particular from 0 to 20% by weight.

Component (a3)

Composition (A*) can further comprise water as component (a3). If water is used, the preferred amount of water used is at least 0.01% by weight, in particular at least 0.1% by weight, particularly preferably at least 0.5% by weight, in particular at least 1% by weight. If water is used, the preferred amount of water used is at most 15% by weight, in particular at most 13% by weight, particularly preferably at most 11% by weight, in particular at most 10% by weight, very particularly preferably at most 9% by weight, in particular at most 8% by weight, in each case based on the total weight of the composition (A*), which is 100% by weight. In a particularly preferred embodiment, water is not used.

According to a further embodiment, the present invention is directed to the process for preparing a porous material as disclosed above, wherein no water is used.

According to an alternative further embodiment, the present invention is directed to the process for preparing a porous material as disclosed above, wherein at least 0.1% by weight of water is added.

A calculated content of amino groups can be derived from the water content and the content of reactive isocyanate groups of the component (a1) by assuming complete reaction of the water with the isocyanate groups of the component (a1) to form a corresponding number of amino groups and adding this content to the content resulting from component (a2) (total $n^{amine}$). The resulting use ratio of the calculated remaining NCO groups $n^{NCO}$ to the amino groups calculated to have been formed and used will hereinafter be referred to as calculated use ratio $n^{NCO}/n^{amine}$ and is an equivalence ratio, i.e. a molar ratio of the respective functional groups.

Water reacts with the isocyanate groups to form amino groups and liberate $CO_2$. Polyfunctional amines are therefore partially produced as intermediate (in situ). In the further course of the reaction, they are reacted with isocyanate groups to form urea linkages. The production of amines as intermediate leads to porous materials having particularly high mechanical stability and low thermal conductivity. However, the $CO_2$ formed must not disrupt gelling to such an extent that the structure of the resulting porous material is influenced in an undesirable way. This gives the abovementioned preferred upper limits for the water content based on the total weight of the composition (A*).

In this case, the calculated use ratio (equivalence ratio) $n^{NCO}/n^{amine}$ is preferably from 1.01 to 5. The equivalence ratio mentioned is particularly preferably from 1.1 to 3, in particular from 1.1 to 2. An excess of $n^{NCO}$ over $n^{amine}$ leads, in this embodiment, to lower shrinkage of the porous material, in particular xerogel, in the removal of the solvent and as a result of synergistic interaction with the catalyst (a4) to an improved network structure and to improved final properties of the resulting porous material.

The components (a1) to (a4) and (am) will hereinafter be referred to collectively as organic gel precursor (A'). It will be obvious to a person skilled in the art that the partial reaction of the component (a1) to (a4) and (am) leads to the actual gel precursor (A') which is subsequently converted into a gel.

Catalyst (a4)

The composition (A*) can further comprise at least one catalyst as component (a4). The amount of component (a4) used is preferably at least 0.1% by weight, in particular at least 0.2% by weight, particularly preferably at least 0.5% by weight, in particular at least 1% by weight. The amount of component (a4) used is preferably at most 30% by weight, in particular at most 28% by weight, particularly preferably at most 24% by weight, in particular at most 21% by weight, in each case based on the total weight of the composition (A*).

Possible catalysts are in principle all catalysts known to those skilled in the art which accelerate the trimerization of isocyanates (known as trimerization catalysts) and/or the reaction of isocyanates with amino groups (known as gelling catalysts) and/or the reaction of isocyanates with water (known as blowing catalysts).

The corresponding catalysts are known per se and have different relative activities in respect of the abovementioned three reactions. Depending on the relative activity, they can thus be assigned to one or more of the abovementioned types. Furthermore, it will be known to a person skilled in the art that reactions other than those mentioned above can also occur.

Corresponding catalysts can be characterized, inter alia, according to their gelling to blowing ratio, as is known, for example, from Polyurethane, $3^{rd}$ edition, G. Oertel, Hanser Verlag, Munich, 1993.

According to a further embodiment, the present invention is directed to the process for preparing a porous material as disclosed above, wherein the catalyst catalyzes the trimerization to form isocyanurate groups.

According to another embodiment, the present invention is directed to the process for preparing a porous material as disclosed above, wherein component (a4) comprises at least one tertiary amino group.

Preferred catalysts (a4) have a balanced gelling to blowing ratio, so that the reaction of the component (a1) with water is not too strongly accelerated, leading to an adverse effect on the network structure, and at the same time results in a short gelling time so that the demolding time is advantageously short. Preferred catalysts at the same time have a significant activity in respect of trimerization. This favorably influences the homogeneity of the network structure, resulting in particularly advantageous mechanical properties.

The catalysts can be able to be incorporated as a monomer building block (incorporatable catalyst) or not be able to be incorporated.

Catalysts preferred as component (a4) are selected from the group consisting of primary, secondary and tertiary amines, triazine derivatives, organic metal compounds, metal chelates, organophosphorus compounds, in particular oxides of phospholenes, quaternary ammonium salts, ammonium hydroxides and also alkali metal and alkaline earth metal hydroxides, alkoxides and carboxylates.

According to a further embodiment, the present invention thus is directed to the process for preparing a porous material as disclosed above, wherein component (a4) is selected from the group consisting of primary, secondary and tertiary amines, triazine derivatives, metal-organic compounds, metal chelates, oxides of phospholenes, quaternary ammonium salts, ammonium hydroxides and alkali metal and alkaline earth metal hydroxides, alkoxides and carboxylates.

Suitable organophosphorus compounds, in particular oxides of phospholenes, are, for example, 1-methylphospholene oxide, 3-methyl-1-phenylphospholene oxide, 1-phenylphospholene oxide, 3-methyl-1-benzylphospholene oxide.

The suitable catalysts are preferably trimerization catalysts. Suitable trimerization catalysts are in particular strong bases, for example quaternary ammonium hydroxides such as tetraalkylammonium hydroxides having from 1 to 4 carbon atoms in the alkyl radical and benzyltrimethylammonium hydroxide, alkali metal hydroxides such as potassium or sodium hydroxide and alkali metal alkoxides such as sodium methoxide, potassium and sodium ethoxide and potassium isopropoxide.

Further suitable trimerization catalysts are, in particular, alkali metal salts of carboxylic acids, e.g. potassium formate, sodium acetate, potassium acetate, caesium acetate, potassium 2-ethylhexanoate, potassium trifluoroacetate, potassium adipate and sodium benzoate, alkali metal salts of saturated and unsaturated long-chain fatty acids having from 10 to 20 carbon atoms, and optionally lateral OH groups.

Further suitable trimerization catalysts are, in particular, N-hydroxyalkyl quaternary ammonium carboxylates, e.g. trimethylhydroxypropylammonium formate.

Tertiary amines are also known per se to those skilled in the art as trimerization catalysts. Tertiary amines, i.e. compounds having at least one tertiary amino group, are particularly preferred as catalysts (a4). Suitable tertiary amines having distinct properties as trimerization catalysts are, in particular, N,N',N"-tris(dialkylaminoalkyl)-s-hexahydrotriazines, such as N,N',N"-tris(dimethylaminopropyl)-s-hexahydrotriazine, tris(dimethylaminomethyl)phenol.

Metal-organic compounds are known per se as gel catalysts to a person skilled in the art. Tin-organic compounds such as tin 2-ethylhexanoate and dibutyltin dilaurate are particularly preferred.

Tertiary amines are also known per se as gel catalysts to a person skilled in the art. As mentioned above, tertiary amines are particularly preferred as catalysts (a4). Suitable tertiary amines having good properties as gel catalysts are, in particular, N,N-dimethylbenzylamine, N,N'-dimethylpiperazine and N,N-dimethylcyclohexylamine, bis(2-dimethylaminoethyl) ether, N,N,N,N,N-pentamethyldiethylenetriamine, methylimidazole, dimethylimidazole, aminopropylimidazole, dimethylbenzylamine, 1,6-diazabicyclo[5.4.0]undec-7-ene, triethylamine, triethylenediamine (1,4-diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, methyldiethanolamine and butyldiethanolamine.

Catalysts which are particularly preferred as component (a4) are selected from the group consisting of dimethylcyclohexylamine, dimethylpiperazine, bis(2-dimethylaminoethyl) ether, N,N,N,N,N-pentamethyldiethylenetriamine, methylimidazole, dimethylimidazole, aminopropylimidazole, dimethylbenzylamine, 1,6-diazabicyclo[5.4.0]undec-7-ene, trisdimethylaminopropylhexahydrotriazine, triethylamine, tris(dimethylaminomethyl)phenol, triethylenediamine (diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, methyldiethanolamine, butyldiethanolamine.

Very particular preference is given to dimethylcyclohexylamine, dimethylpiperazine, methylimidazole, dimethylimidazole, dimethylbenzylamine, 1,6-diazabicyclo[5.4.0]undec-7-ene, trisdimethylaminopropylhexahydrotriazine, triethylamine, tris(dimethylaminomethyl)phenol, triethylenediamine (diazabicyclo[2.2.2]octane), dimethylaminoethanolamine, dimethylaminopropylamine, N,N,N-trimethylaminoethylethanolamine, triethanolamine, diethanolamine, methyldiethanolamine, butyldiethanolamine, metal acetylacetonates, ammonium ethylhexanoates and metal ethylhexanoates.

Therefore, according to a further embodiment, the present invention is directed to the process for preparing a porous material as disclosed above, wherein component (a4) is selected from the group consisting of dimethylcyclohexylamine, bis(2-dimethylaminoethyl) ether, N,N,N,N,N-pentamethyldiethylenetriamine, methylimidazole, dimethylimidazole, aminopropylimidazole, dimethylbenzylamine, 1,6-diazabicyclo[5.4.0]undec-7-ene, trisdimethylaminopropylhexahydrotriazine, triethylamine, tris(dimethylaminomethyl)phenol, triethylenediamine (diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, methyldiethanolamine, butyldiethanolamine, metal acetylacetonates, ammonium ethylhexanoates and metal ethylhexanoates.

Solvent (B)

According to the present invention, the reaction takes place in the presence of a solvent (B).

For the purposes of the present invention, the term solvent (B) comprises liquid diluents, i.e. both solvents in the narrower sense and also dispersion media. The mixture can, in particular, be a true solution, a colloidal solution or a dispersion, e.g. an emulsion or suspension. The mixture is preferably a true solution. The solvent (B) is a compound which is liquid under the conditions of step (a), preferably an organic solvent.

The solvent (B) can in principle be any suitable compound or mixture of a plurality of compounds, with the solvent (B) being liquid under the temperature and pressure conditions under which the mixture is provided in step (a) (dissolution conditions for short). The composition of the solvent (B) is selected so that it is able to dissolve or disperse, preferably dissolve, the organic gel precursor. Preferred solvents (B) are those which are a solvent for the organic gel precursor (A'), i.e. ones which dissolve the organic gel precursor (A') completely under the reaction conditions.

The reaction product of the reaction in the presence of the solvent (B) is initially a gel, i.e. a viscoelastic chemical network which is swollen by the solvent (B). A solvent (B) which is a good swelling agent for the network formed in step (b) generally leads to a network having fine pores and a small average pore diameter, while a solvent (B) which is a poor swelling agent for the gel resulting from step (b) generally leads to a coarse-pored network having a large average pore diameter.

The choice of the solvent (B) thus influences the desired pore size distribution and the desired porosity. The choice of the solvent (B) is also generally made in such a way that precipitation or flocculation due to formation of a precipitated reaction product does not occur to a significant extent during or after step (b) of the process of the invention.

When a suitable solvent (B) is chosen, the proportion of precipitated reaction product is usually less than 1% by weight, based on the total weight of the mixture. The amount of precipitated product formed in a particular solvent (B) can be determined gravimetrically by filtering the reaction mixture through a suitable filter before the gelling point.

Possible solvents (B) are solvents known from the prior art for isocyanate-based polymers. Preferred solvents are those which are a solvent for the components (a1) to (a4), i.e. solvents which dissolve the constituents of the components (a1) to (a4) virtually completely under the reaction conditions. The solvent (B) is preferably inert, i.e. unreactive, toward component (a1). Furthermore, solvent (B) preferably is miscible with monool (am).

Possible solvents (B) are, for example, ketones, aldehydes, alkyl alkanoates, amides such as formamide and N-methylpyrrollidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible.

Further possibilities as solvents (B) are acetals, in particular diethoxymethane, dimethoxymethane and 1,3-dioxolane.

Dialkyl ethers and cyclic ethers are likewise suitable as solvent (B). Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

Aldehydes and/or ketones are particularly preferred as solvent (B). Aldehydes or ketones suitable as solvent (B) are, in particular, those corresponding to the general formula $R^2$—(CO)—$R^1$, where $R^1$ and $R^2$ are each hydrogen or an alkyl group having 1, 2, 3, 4, 5, 6 or 7 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, diethyl ketone, methyl ethyl ketone, methyl isobutyl ketone, methyl n-butyl ketone, methyl pentylketone, dipropyl ketone, ethyl isopropyl ketone, ethyl butyl ketone, diisobutylketone, 5-methyl-2-acetyl furan, 2-acetylfuran, 2-methoxy-4-methylpentan-2-one, 5-methylheptan-3-one, octanone, cyclohexanone, cyclopentanone, and acetophenone. The abovementioned aldehydes and ketones can also be used in the form of mixtures. Ketones and aldehydes having alkyl groups having up to 3 carbon atoms per substituent are preferred as solvent (B).

Further preferred solvents are alkyl alkanoates, in particular methyl formate, methyl acetate, ethyl formate, isopropyl acetate, butyl acetate, ethyl acetate, glycerine triacetate and ethyl acetoacetate. Preferred halogenated solvents are described in WO 00/24799, page 4, line 12 to page 5, line 4.

Further suitable solvents (B) are organic carbonates such as for example dimethyl carbonate, ethylene carbonate, propylene carbonate or butylene carbonate.

In many cases, particularly suitable solvents (B) are obtained by using two or more completely miscible compounds selected from the abovementioned solvents.

To obtain a sufficiently stable gel which does not shrink too much during drying in step (c) in step (b), the proportion of the composition (A) based on the total weight of the mixture (I) comprising composition (A) and the solvent (B), which is 100% by weight, must generally be not less than 5% by weight. The proportion of the composition (A) based on the total weight of the mixture (I) comprising composition (A) and the solvent (B), which is 100% by weight, is preferably at least 6% by weight, particularly preferably at least 8% by weight, in particular at least 10% by weight.

On the other hand, the concentration of the composition (A) in the mixture provided must not be too high since otherwise no porous material having favorable properties is obtained. In general, the proportion of the composition (A) based on the total weight of the mixture (I) comprising composition (A) and the solvent (B), which is 100% by weight, is not more than 40% by weight. The proportion of the composition (A) based on the total weight of the mixture (I) comprising composition (A) and the solvent (B), which is 100% by weight, is preferably not more than 35% by weight, particularly preferably not more than 25% by weight, in particular not more than 20% by weight.

The total proportion by weight of the composition (A) based on the total weight of the mixture (I) comprising composition (A) and the solvent (B), which is 100% by weight, is preferably from 8 to 25% by weight, in particular from 10 to 20% by weight, particularly preferably from 12 to 18% by weight. Adherence to the amount of the starting materials in the range mentioned leads to porous materials having a particularly advantageous pore structure, low thermal conductivity and low shrinking during drying.

Before the reaction, it is necessary to mix the components used, in particular to mix them homogeneously. The rate of mixing should be high relative to the rate of the reaction in order to avoid mixing defects. Appropriate mixing methods are known per se to those skilled in the art.

According to the present invention, a solvent (B) is used. The solvent (B) can also be a mixture of two or more solvents, for example three or four solvents. Suitable solvents are for example mixtures of two or more ketones, for example mixtures of acetone and diethyl ketone, mixtures of acetone and methyl ethyl ketone or mixtures of diethyl ketone and methyl ethyl ketone.

Further preferred solvents are mixtures of propylene carbonate with one or more solvents, for example mixtures of propylene carbonate and diethyl ketone, or mixtures of propylene carbonate with two or more ketones, for example mixtures of propylene carbonate with acetone and diethyl ketone, mixtures of propylene carbonate with acetone and methyl ethyl ketone or mixtures of propylene carbonate with diethyl ketone and methyl ethyl ketone.

Preferred Process for Producing the Porous Materials

The process of the invention comprises at least the following steps:

(a) provision of the mixture comprising the composition (A) and the solvent (B) as described above,
(b) reaction of the components in composition (A) in the presence of the solvent (B) to form a gel and
(c) drying of the gel obtained in the preceding step.

Preferred embodiments of steps (a) to (c) will be described in detail below.

Step (a)

According to the invention, a mixture comprising composition (A) and the solvent (B) are provided in step (a).

The components of composition (A), for example the components (a1) and (a2) are preferably provided separately from one another, each in a suitable partial amount of the solvent (B). The separate provision makes it possible for the gelling reaction to be optimally monitored or controlled before and during mixing.

Component (am), (a3) and (a4) are particularly preferably provided as a mixture with component (a2), i.e. separately from component (a1).

The mixture or mixtures provided in step (a) can also comprise customary auxiliaries known to those skilled in the art as further constituents. Mention may be made by way of example of surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and biocides.

Further information regarding the abovementioned auxiliaries and additives may be found in the specialist literature, e.g. in Plastics Additive Handbook, 5th edition, H. Zweifel, ed. Hanser Publishers, Munich, 2001.

Step (b)

According to the invention, the reaction of the components of composition (A) takes place in the presence of the solvent (B) to form a gel in step (b). To carry out the reaction, a homogeneous mixture of the components provided in step (a) firstly has to be produced.

The provision of the components provided in step (a) can be carried out in a conventional way. A stirrer or another mixing device is preferably used here in order to achieve good and rapid mixing. The time required for producing the homogeneous mixture should be short in relation to the time during which the gelling reaction leads to at least partial formation of a gel, in order to avoid mixing defects. The other mixing conditions are generally not critical; for example, mixing can be carried out at from 0 to 100° C. and from 0.1 to 10 bar (absolute), in particular at, for example, room temperature and atmospheric pressure. After a homogeneous mixture has been produced, the mixing apparatus is preferably switched off.

The gelling reaction is a polyaddition reaction, in particular a polyaddition of isocyanate groups and amino groups.

For the purposes of the present invention, a gel is a crosslinked system based on a polymer which is present in contact with a liquid (known as Solvogel or Lyogel, or with water as liquid: aquagel or hydrogel). Here, the polymer phase forms a continuous three-dimensional network.

In step (b) of the process of the invention, the gel is usually formed by allowing to rest, e.g. by simply allowing the container, reaction vessel or reactor in which the mixture is present (hereinafter referred to as gelling apparatus) to stand. The mixture is preferably no longer stirred or mixed during gelling (gel formation) because this could hinder formation of the gel. It has been found to be advantageous to cover the mixture during gelling or to close the gelling apparatus.

Gelling is known per se to a person skilled in the art and is described, for example, in WO 2009/027310 on page 21, line 19 to page 23, line 13.

Step (c)

According to the invention, the gel obtained in the previous step is dried in step (c).

Drying under supercritical conditions is in principle possible, preferably after replacement of the solvent by $CO_2$ or other solvents suitable for the purposes of supercritical drying. Such drying is known per se to a person skilled in the art. Supercritical conditions characterize a temperature and a pressure at which $CO_2$ or any solvent used for removal of the gelation solvent is present in the supercritical state. In this way, shrinkage of the gel body on removal of the solvent can be reduced.

However, in view of the simple process conditions, preference is given to drying the gels obtained by conversion of the liquid comprised in the gel into the gaseous state at a temperature and a pressure below the critical temperature and the critical pressure of the liquid comprised in the gel.

The drying of the gel obtained is preferably carried out by converting the solvent (B) into the gaseous state at a temperature and a pressure below the critical temperature and the critical pressure of the solvent (B). Accordingly, drying is preferably carried out by removing the solvent (B) which was present in the reaction without prior replacement by a further solvent.

Such methods are likewise known to those skilled in the art and are described in WO 2009/027310 on page 26, line 22 to page 28, line 36.

According to a further embodiment, the present invention is directed to the process for preparing a porous material as disclosed above, wherein the drying according to step c) is carried out by converting the liquid comprised in the gel into the gaseous state at a temperature and a pressure below the critical temperature and the critical pressure of the liquid comprised in the gel.

According to a further embodiment, the present invention is directed to the process for preparing a porous material as disclosed above, wherein the drying according to step c) is carried out under supercritical conditions.

Properties of the Porous Materials and Use

The present invention further provides the porous materials which can be obtained by the process of the invention. Aerogels are preferred as porous materials for the purposes of the present invention, i.e. the porous material which can be obtained according to the invention is preferably an aerogel.

Furthermore, the present invention therefore is directed to a porous material which is obtained or obtainable by the process for preparing a porous material as disclosed above. In particular, the present invention is directed to a porous material which is obtained or obtainable by the process for preparing a porous material as disclosed above, wherein the drying according to step c) is carried out under supercritical conditions.

The average pore diameter is determined by scanning electron microscopy and subsequent image analysis using a statistically significant number of pores. Corresponding methods are known to those skilled in the art.

The volume average pore diameter of the porous material is preferably not more than 4 microns. The volume average pore diameter of the porous material is particularly preferably not more than 3 microns, very particularly preferably not more than 2 microns and in particular not more than 1 micron.

Although a very small pore size combined with a high porosity is desirable from the point of view of a low thermal conductivity, from the point of view of production and to obtain a sufficiently mechanically stable porous material, there is a practical lower limit to the volume average pore diameter. In general, the volume average pore diameter is at least 20 nm, preferably at least 50 nm.

The porous material which can be obtained according to the invention preferably has a porosity of at least 70% by volume, in particular from 70 to 99% by volume, particularly preferably at least 80% by volume, very particularly preferably at least 85% by volume, in particular from 85 to 95% by volume. The porosity in % by volume means that the specified proportion of the total volume of the porous material comprises pores. Although a very high porosity is usually desirable from the point of view of a minimal thermal conductivity, an upper limit is imposed on the porosity by the mechanical properties and the processability of the porous material.

The components of composition (A), for example the components (am) and (a1) to (a3) and optionally (a4), as long as the catalyst can be incorporated, are present in reactive (polymer) form in the porous material which can be obtained according to the invention. Owing to the composition according to the invention, the monomer building blocks (a1) and (a2) are predominantly bound via urea linkages and/or via isocyanurate linkages in the porous material, with the isocyanurate groups being formed by trimerization of isocyanate groups of the monomer building blocks (a1). If the porous material comprises further components, further possible linkages are, for example, urethane groups formed by reaction of isocyanate groups with alcohols or phenols.

The determination of the mol % of the linkages of the monomer building blocks in the porous material is carried out by means of NMR spectroscopy (nuclear magnetic resonance) in the solid or in the swollen state. Suitable methods of determination are known to those skilled in the art.

The density of the porous material which can be obtained according to the invention is usually from 20 to 600 g/l, preferably from 50 to 500 g/l and particularly preferably from 70 to 200 g/l.

The process of the invention gives a coherent porous material and not only a polymer powder or particles. Here, the three-dimensional shape of the resulting porous material is determined by the shape of the gel which is in turn determined by the shape of the gelling apparatus. Thus, for example, a cylindrical gelling vessel usually gives an approximately cylindrical gel which can then be dried to give a porous material having a cylindrical shape.

The porous materials which can be obtained according to the invention have a low thermal conductivity, a high porosity and a low density combined with high mechanical stability. In addition, the porous materials have a small average pore size. The combination of the abovementioned properties allows the materials to be used as insulation material in the field of thermal insulation, in particular for applications in the ventilated state as building materials.

The porous materials which can be obtained according to the invention have advantageous thermal properties and also further advantageous properties such as simple processability and high mechanical stability, for example low brittleness.

In comparison to materials known from the state of the art, the porous materials according to the present invention have a reduced water uptake. In the context of the present invention, the water uptake is defined as the amount of water which included in a sample after soaking it completely under water for one hour. As is exemplified by the examples, a porous material according to the state of the art has a water uptake of several hundred percent whereas the porous materials according to the present invention only have a reduced water uptake of less than 100%.

The water uptake may be less than 100% and as low as zero, i.e. no water uptake. Furthermore, after water uptake, the release of water from the porous material according from the invention may be adjusted in such a way that the structure of the porous material according to the present invention remains substantially intact.

Preferably, the porous material according to the present invention has a water uptake of less than 100% and the water subsequently can be released while the structure of the porous material remains substantially intact.

The present invention is also directed to the use of porous materials as disclosed above or a porous material obtained or obtainable according to a process as disclosed above as thermal insulation material or for vacuum insulation panels. The thermal insulation material is for example insulation material which is used for insulation in the interior or the exterior of a building. The porous material according to the present invention can advantageously be used in thermal insulation systems such as for example composite materials.

According to a further embodiment, the present invention therefore is directed to the use of porous materials as disclosed above, wherein the porous material is used in interior or exterior thermal insulation systems.

The present invention includes the following embodiments, wherein these include the specific combinations of embodiments as indicated by the respective interdependencies defined therein.

1. Process for preparing a porous material, at least comprising the steps of:
    a) providing a mixture (I) comprising
        (i) a composition (A) comprising components suitable to form an organic gel and
        (ii) a solvent (B),
    b) reacting the components in the composition (A) comprising at least one monool (am) and a composition (A*) comprising components suitable to form an organic gel, and
    c) drying of the gel obtained in step b).

2. The process according to embodiment 1, wherein the monool is present in the composition (A) in an amount of from 0.1 to 30% by weight based on the composition (A).
3. The process according to any of embodiments 1 or 2, wherein the monool is selected from the group consisting of aliphatic monools with 1 to 20 carbon atoms and aromatic monools with 1 to 20 carbon atoms.
4. The process according to any of embodiments 1 to 3, wherein the composition (A*) comprises at least one polyfunctional isocyanate as component (a1), and at least one aromatic amine as component (a2), optionally comprises water as component (a3), and optionally comprises at least one catalyst as component (a4).
5. The process according to embodiment 4, wherein the at least one aromatic amine (a2) is a polyfunctional aromatic amine.
6. The process according to any of embodiments 4 or 5, wherein the at least one aromatic amine (a2) has the general formula (I)

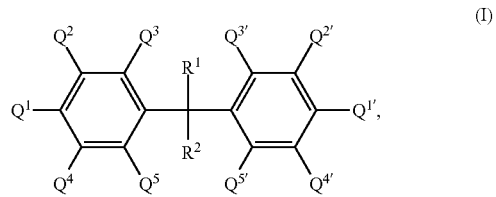

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula (I) comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group.

7. The process according to any of embodiments 1 to 6, wherein composition (A*) comprises
    (a1) from 25 to 94.9% by weight of at least one polyfunctional isocyanate, and
    (a2) from 0.1 to 30% by weight of at least one polyfunctional aromatic amine having the general formula (I)

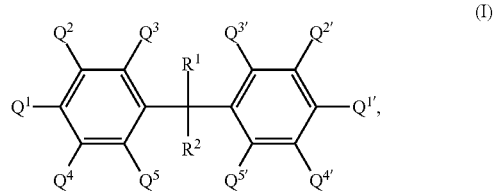

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula (I) comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group, (a3) from 0 to 15% by weight of water,
(a4) from 0.1 to 30% by weight of at least one catalyst, and in each case based on the total weight of the components (a1), (a2), (a3), and (a4), where the % by weight of the components (a1), (a2), (a3), and (a4) add up to 100% by weight.

8. The process according to any of embodiments 4 to 7, wherein the amine component (a2) comprises at least one compound selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are selected independently from among linear or branched alkyl groups which have from 1 to 12 carbon atoms and can bear further functional groups.

9. The process according to any of embodiments 4 to 8, wherein component (a4) is selected from the group consisting of primary, secondary and tertiary amines, triazine derivatives, metal-organic compounds, metal chelates, oxides of phospholenes, quaternary ammonium salts, ammonium hydroxides and alkali metal and alkaline earth metal hydroxides, alkoxides and carboxylates.

10. The process according to any of embodiments 4 to 9, wherein the catalyst catalyzes the trimerization to form isocyanurate groups.

11. The process according any of embodiments 1 to 10, wherein at least 0.1% by weight of water is added.

12. The process according to any of embodiments 1 to 11, wherein the drying according to step c) is carried out by converting the liquid comprised in the gel into the gaseous state at a temperature and a pressure below the critical temperature and the critical pressure of the liquid comprised in the gel.

13. A porous material, which is obtained or obtainable by the process according to any of embodiments 1 to 12.

14. A porous material according to embodiment 13, which is obtained or obtainable by the process according to any of embodiments 1 to 12, wherein the drying according to step c) is carried out under supercritical conditions 15. The use of porous materials according to embodiment 13 or 14 or a porous material obtained or obtainable by the process according to any of embodiments 1 to 12 as thermal insulation material or for vacuum insulation panels.

16. The use according to embodiment 15, wherein the porous material is used in interior or exterior thermal insulation systems.

Examples will be used below to illustrate the invention.

EXAMPLES

1. Methods 1.1 Determination of Thermal Conductivity

The thermal conductivity was measured according to DIN EN 12667 with a heat flow meter from Hesto (Lambda Control A50).

1.2 Solvent Extraction with Supercritical Carbon Dioxide

One or several gel monoliths were placed onto sample trays in an autoclave of 25 l volume. Subsequent to filling with supercritical carbon dioxide ($scCO_2$), the gelation solvent was removed (drying) by flowing $scCO_2$ through the autoclave for 24 h (20 kg/h). Process pressure was kept between 120 and 130 bar and process temperature at 45° C. in order to maintain carbon dioxide in a supercritical state. At the end of the process, the pressure was reduced to normal atmospheric pressure in a controlled manner while maintaining the system at a temperature of 45° C. The autoclave was opened, and the obtained porous monoliths were removed.

1.3 Water Uptake Test

The mass of a sample was determined before and after soaking it completely under water for one hour. The water uptake was calculated accordingly in relation to the weight of the sample. After drying the sample for two hours at 100° C. the shrinkage and the surface appearance was investigated.

2. Materials

Component a1: oligomeric MDI (Lupranat M200) having an NCO content of 30.9 g per 100 g accordance with ASTM D-5155-96 A, a functionality in the region of three and a viscosity of 2100 mPa·s at 25° C. in accordance with DIN 53018 (hereafter "M200")

Component a2: 3,3',5,5'-Tetraethyl-4,4'diaminodiphenylmethane (hereinafter "MDEA")

Catalyst: Dabco K15 (potassium ethylhexanoate dissolved in diethylene glycol (85%))

3. Examples

Thermal conductivity values for all examples are shown in Table 1. Furthermore, data regarding the water uptake and density are included for several examples.

3.1 Example 1 (Comparative)

In a polypropylene container, 48 g M200 were dissolved under stirring in 220 g MEK at 20° C. leading to a clear solution. Similarly, 12 g MDEA, 4 g Dabco K15 and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with $scCO_2$ in a 25 l autoclave leading to a porous material.

3.2 Example 2

In a polypropylene container, 48 g M200 were dissolved under stirring in 220 g MEK at 20° C. leading to a clear solution. Similarly, 12 g MDEA, 4 g Dabco K15, 16 g hexadecanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.3 Example 3

In a polypropylene container, 48 g M200 were dissolved under stirring in 220 g MEK at 20° C. leading to a clear solution. Similarly, 12 g MDEA, 4 g Dabco K15, 16 g decanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.4 Example 4

In a polypropylene container, 48 g M200 were dissolved under stirring in 220 g MEK at 20° C. leading to a clear solution. Similarly, 12 g MDEA, 4 g Dabco K15, 8 g decanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.5 Example 5

In a polypropylene container, 48 g M200 were dissolved under stirring in 220 g MEK at 20° C. leading to a clear solution. Similarly, 12 g MDEA, 4 g Dabco K15, 16 g nonanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.6 Example 6

In a polypropylene container, 48 g M200 were dissolved under stirring in 220 g MEK at 20° C. leading to a clear solution. Similarly, 12 g MDEA, 4 g Dabco K15, 8 g butanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.7 Example 7

In a polypropylene container, 48 g M200 were dissolved under stirring in 220 g MEK at 20° C. leading to a clear solution. Similarly, 12 g MDEA, 4 g Dabco K15, 8 g ethanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.8 Example 8

In a polypropylene container, 48 g M200 were dissolved under stirring in 220 g MEK at 20° C. leading to a clear solution. Similarly, 12 g MDEA, 4 g Dabco K15, 4 g butanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.9 Example 9

In a polypropylene container, 48 g M200 were dissolved under stirring in 220 g MEK at 20° C. leading to a clear solution. Similarly, 12 g MDEA, 4 g Dabco K15, 2 g butanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.10 Example 10

In a polypropylene container, 48 g M200 were dissolved under stirring in 220 g MEK at 20° C. leading to a clear solution. Similarly, 12 g MDEA, 4 g Dabco K15, 1 g butanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.11 Example 11

In a polypropylene container, 48 g M200 were dissolved under stirring in 220 g MEK at 20° C. leading to a clear solution. Similarly, 12 g MDEA, 4 g Dabco K15, 4 g decanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h.

3.12 Example 12

In a polypropylene container, 48 g M200 were dissolved under stirring in 220 g MEK at 20° C. leading to a clear solution. Similarly, 12 g MDEA, 4 g Dabco K15, 2 g decanol and 4 g water were dissolved in 220 g MEK to obtain a second solution. The solutions were combined in a rectangular container (20×20 cm×5 cm height) by pouring one solution into the other, which led to a clear, homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.13. Example 13

In a polypropylene container, 1 g graphite and 48 g M200 were stirred in 220 g MEK at 20° C. leading to a black solution with dispersed graphite. 12 g MDEA, 4 g Dabco K15, 12 g butanol and 4 g water were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.14. Example 14

In a polypropylene container, 1 g graphite, 1 g melamine and 48 g M200 were stirred in 220 g MEK at 20° C. leading to a black solution with dispersed graphite and melamine. 12 g MDEA, 4 g Dabco K15, 12 g butanol and 4 g water were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.15. Example 15

In a polypropylene container, 1 g graphite, 1 g Exolit AP422 and 48 g M200 were stirred in 220 g MEK at 20° C. leading to a black solution with dispersed graphite and Exolit AP422. 12 g MDEA, 4 g Dabco K15, 12 g butanol and 4 g water were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.16. Example 16

In a polypropylene container, 1 g graphite, 1 g melamine and 48 g M200 were stirred in 220 g MEK at 20° C. leading to a black solution with dispersed graphite and melamine. 12 g MDEA, 4 g Dabco K15, 8 g butanol and 4 g water were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

3.17. Example 17

In a polypropylene container, 1 g graphite, 1 g melamine and 48 g M200 were stirred in 220 g MEK at 20° C. leading to a black solution with dispersed graphite and melamine. 12 g MDEA, 4 g Dabco K15, 12 g decanol and 4 g water were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

4. Results

TABLE 1

Results.

| | Density [kg/m$^3$] | Thermal conductivity [mW/m*K] (p = 1 bar, T = 10° C.) | Water uptake [%] |
|---|---|---|---|
| Example 1 (comparative) (MDEA, K15, H$_2$O) | 145 | 17.9 | 480 |
| Example 2 (MDEA, K15, H$_2$O, 16 g hexadecanol) | 147 | 16.7 | 14 |
| Example 3 (MDEA, K15, H$_2$O, 16 g decanol) | 143 | 16.6 | 15 |
| Example 4 (MDEA, K15, H2O, 8 g decanol) | | 17.0 | |
| Example 5 (MDEA, K15, H$_2$O, 16 g nonanol) | 137 | 16.5 | |
| Example 6 (MDEA, K15, H$_2$O, 8 g butanol) | | 16.9 | 16 |
| Example 7 MDEA, K15, H$_2$O, 8 g ethanol) | | 17.0 | |
| Example 8 (MDEA, K15, H$_2$O, 4 g butanol) | 132 | 17.1 | 17 |
| Example 9 (MDEA, K15, H$_2$O, 2 g butanol) | | 17.1 | |
| Example 10 (MDEA, K15, H$_2$O, 1 g butanol) | | 17.1 | |
| Example 11 (MDEA, K15, H$_2$O, 4 g decanol) | | 17.0 | 12 |
| Example 12 (MDEA, K15, H$_2$O, 2 g decanol) | 132 | 17.0 | 29 |
| Example 13 (MDEA, K15, H2O, 12 g butanol) + 1 g graphite | | 15.7 | |
| Example 14 (MDEA, K15, H2O, 12 g butanol) + 1 g graphite + 1 g melamine | 134 | 15.8 | |
| Example 15 (MDEA, K15, H2O, 12 g butanol) + 1 g graphite + 1 g Exolit AP422 | | 15.8 | |
| Example 16 (MDEA, K15, H2O, 8 g butanol) + 1 g graphite + 1 g melamine | 134 | 16.0 | |

TABLE 1-continued

Results.

| | Density [kg/m³] | Thermal conductivity [mW/m*K] (p = 1 bar, T = 10° C.) | Water uptake [%] |
|---|---|---|---|
| Example 17 (MDEA, K15, H2O, 8 g decanol) + 1 g graphite + 1 g melamine | 138 | 15.9 | |

As is exemplified by the examples, a porous material according to the state of the art (example 1, comparative) has a water uptake of several hundred percent whereas the porous materials according to the present invention only have a reduced water uptake of less than 100%.

Furthermore, the porous materials according to the present invention have good insulating properties as shown by the thermal conductivity.

5. Abbreviations

H₂O Water
K15 Dabco K15 (PUR catalyst)
M200 Lupranate M200 (polyisocyanate)
MEK Methyl ethyl ketone
MDEA 4,4'-Methylene-bis(2,6-diethylaniline)

The invention claimed is:
1. A process for preparing a porous material, comprising:
a) providing a mixture (I) comprising
(i) a composition (A) comprising a monool (am) and a composition (A*) comprising: a polyfunctional isocyanate as component (a1), at least one aromatic amine as component (a2), optionally, water as component (a3), and optionally at least one catalyst as component (a4); and
(ii) a solvent (B),
b) reacting the components of the composition (A) in the solvent (B) to form a mixture of an organic gel in the solvent (B), and c) drying of the mixture to remove the solvent (B) and obtain the organic gel as the porous material obtained in b),
wherein
the at least one aromatic amine (a2) is a polyfunctional aromatic amine,
the monool is present in the composition (A) in an amount of from 0.5 to 25% by weight based on the composition (A).
2. The process according to claim 1, wherein the monool is selected from the group consisting of aliphatic monools with 1 to 20 carbon atoms and aromatic monools with 1 to 20 carbon atoms.
3. The process according to claim 1, wherein the at least one aromatic amine (a2) has the general formula (I)

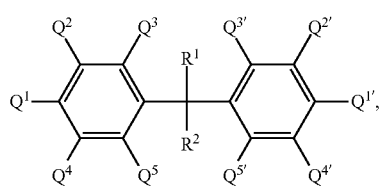

where $R^1$ and $R^2$ can be identical or different and are each selected independently from the group consisting of hydrogen and linear or branched alkyl groups having from 1 to 6 carbon atoms, and all substituents $Q^1$ to $Q^5$ and $Q^{1'}$ to $Q^{5'}$ are identical or different and are each selected independently from the group consisting of hydrogen, a primary amino group and a linear or branched alkyl group having from 1 to 12 carbon atoms, where the alkyl group can bear further functional groups, with the proviso that the compound having the general formula (I) comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group.
4. The process according to claim wherein composition (A*) comprises
(a1) from 25 to 94.9% by weight of at least one polyfunctional isocyanate, and
(a2) from 0.1 to 30% by weight of at least one polyfunctional aromatic amine having the general formula (I)

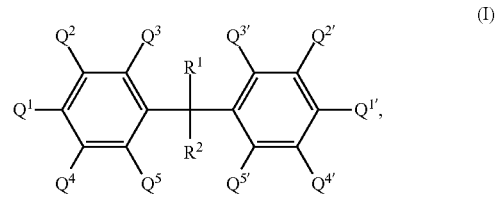

where $R^1$ and $R^2$ can be identical or different and are each selected independently from the group consisting of hydrogen and linear or branched alkyl groups having from 1 to 6 carbon atoms, and all substituents $Q^1$ to $Q^5$ and $Q^{1'}$ to $Q^{5'}$ are identical or different and are each selected independently from the group consisting of hydrogen, a primary amino group and a linear or branched alkyl group having from 1 to 12 carbon atoms, where the alkyl group can bear further functional groups, with the proviso that the compound having the general formula (I) comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group,
(a3) from 0 to 15% by weight of water,
(a4) from 0.1 to 30% by weight of at least one catalyst, and
in each case based on the total weight of the components (a1), (a2), (a3), and (a4), where the % by weight of the components (a1), (a2), (a3), and (a4) add up to 100% by weight.
5. The process according to claim 1, wherein the amine component (a2) comprises at least one compound selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are selected independently from the group consisting of linear or branched alkyl groups which have from 1 to 12 carbon atoms and can bear further functional groups.
6. The process according to claim 1, wherein component (a4) is present and is selected from the group consisting of primary, secondary and tertiary amines, triazine derivatives, metal-organic compounds, metal chelates, oxides of phospholenes, quaternary ammonium salts, ammonium hydroxides and alkali metal and alkaline earth metal hydroxides, alkoxides and carboxylates.

7. The process according to claim 1, wherein at least one catalyst as component (a4) is present and the catalyst (a4) catalyzes trimerization of the at least one polyfunctional isocyanate to form isocyanurate groups.

8. The process according to claim 1, wherein at least 0.1% by weight of water as component (a3) is added.

9. The process according to claim 1, wherein the drying according to c) is carried out by converting the liquid comprised in the gel into the gaseous state at a temperature and a pressure below the critical temperature and the critical pressure of the liquid comprised in the gel.

10. A porous material, which is obtained by the process according to claim 1.

11. The porous material according to claim 10, wherein the drying according to c) is carried out under supercritical conditions.

12. A thermal insulation material or a vacuum insulation panel comprising the porous material according to claim 10.

13. An interior or exterior thermal insulation system comprising the thermal insulation material or the vacuum insulation panel according to claim 12.

\* \* \* \* \*

UNITED STATES PATENT AND TRADEMARK OFFICE
CERTIFICATE OF CORRECTION

PATENT NO. : 10,717,841 B2  
APPLICATION NO. : 15/128515  
DATED : July 21, 2020  
INVENTOR(S) : Marc Fricke et al.

Page 1 of 1

It is certified that error appears in the above-identified patent and that said Letters Patent is hereby corrected as shown below:

On the Title Page

Column 1, Item (51), under "Intl. Cl.", Lines 1-13, "B65D 81/38" should read -- C08J 9/28 --.

In the Claims

Column 28, Line 15, Claim 4, "claim" should read -- claim 1, --.

Signed and Sealed this  
First Day of June, 2021

Drew Hirshfeld  
*Performing the Functions and Duties of the  
Under Secretary of Commerce for Intellectual Property and  
Director of the United States Patent and Trademark Office*